(12) United States Patent
Liang et al.

(10) Patent No.: US 11,600,002 B2
(45) Date of Patent: Mar. 7, 2023

(54) BIN FILTERING

(71) Applicant: QUALCOMM Incorporated, San Diego, CA (US)

(72) Inventors: Jian Liang, San Diego, CA (US); Andrew Evan Gruber, Arlington, MA (US); Tao Wang, Sunnyvale, CA (US); Srihari Babu Alla, San Diego, CA (US); Kalyan Kumar Bhiravabhatla, Bengaluru (IN); Jonnala Gadda Nagendra Kumar, San Diego, CA (US); William Licea-Kane, Arlington, MA (US); Fredrick Alan Hickman, Oceanside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 16/892,096

(22) Filed: Jun. 3, 2020

(65) Prior Publication Data

US 2021/0383545 A1 Dec. 9, 2021

(51) Int. Cl.
*G06T 7/11* (2017.01)
*G06T 1/60* (2006.01)
*G06T 1/20* (2006.01)
*G06T 7/136* (2017.01)
*G06T 5/40* (2006.01)

(52) U.S. Cl.
CPC ............... *G06T 7/11* (2017.01); *G06T 1/20* (2013.01); *G06T 1/60* (2013.01); *G06T 5/40* (2013.01); *G06T 7/136* (2017.01); *G06T 2207/20024* (2013.01)

(58) Field of Classification Search
CPC ... G06T 7/11; G06T 7/136; G06T 1/20; G06T 1/60; G06T 5/40; G06T 2207/20024
See application file for complete search history.

(56) References Cited

U.S. PATENT DOCUMENTS

| 9,098,943 B1* | 8/2015 | Baldwin | ............... G06T 15/005 |
| 2012/0182321 A1* | 7/2012 | Kondo | .................... H04N 5/765 |
| | | | 345/660 |
| 2015/0379663 A1* | 12/2015 | Gruber | ...................... G06T 1/20 |
| | | | 345/522 |
| 2016/0042491 A1* | 2/2016 | Croxford | ................ G06T 11/40 |
| | | | 345/545 |
| 2017/0053375 A1* | 2/2017 | Bolz | ....................... G09G 5/363 |
| 2017/0083997 A1* | 3/2017 | Gruber | .................... G06T 11/40 |
| 2018/0182066 A1* | 6/2018 | Saleh | ...................... G06T 11/40 |
| 2018/0295400 A1* | 10/2018 | Thomas | ............... H04N 19/167 |

* cited by examiner

*Primary Examiner* — Kenny A Cese
(74) *Attorney, Agent, or Firm* — Holland & Hart LLP

(57) ABSTRACT

Methods, systems, and devices for graphics processing are described. A device may receive an image including a set of pixels. The device may render a first subset of pixels in each bin of a set of bins during a first rendering pass, and defer rendering a second subset of pixels and a third subset of pixels in each bin of the set of bins during the first rendering pass. The second subset of pixels may include edge pixels and the third subset of pixels may be between the first subset of pixels and the second subset of pixels. The device may render the second subset of pixels and the third subset of pixels in each bin of the set of bins during a second rendering pass based on rendering the first subset of pixels. The device may then output the image based on the first and second rendering pass.

18 Claims, 10 Drawing Sheets

BIN FILTERING

FIELD OF TECHNOLOGY

The following relates generally to graphics processing and more specifically to bin filtering for graphics processing.

BACKGROUND

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices.

SUMMARY

Various aspects of the described techniques relate to improved methods, systems, devices, and apparatuses that support bin filtering. A device may be configured with one or multiple graphics processing unit (GPUs) for performing graphical operations. A GPU may, in some examples, be a dedicated hardware unit having functions and programmable components for rendering graphics and executing GPU applications. As part of graphics rendering, a GPU may be configured to split an image scene into tiles (e.g., "tile-based rendering" or "binning"). The GPU may be configured to support post-rendering effects such as filtering, without expanding bins.

A method of graphics processing at a device is described. The method may include receiving an image including a set of pixels, rendering a first subset of pixels in each bin of a set of bins during a first rendering pass, deferring rendering a second subset of pixels and a third subset of pixels in each bin of the set of bins during the first rendering pass, where the second subset of pixels includes edge pixels associated with the set of pixels and the third subset of pixels is between the first subset of pixels and the second subset of pixels, rendering the second subset of pixels and the third subset of pixels in each bin of the set of bins during a second rendering pass based on rendering the first subset of pixels, and outputting a representation of the image based on rendering the first subset of pixels during the first rendering pass and rendering the second subset of pixels and the third subset of pixels during the second rendering pass.

An apparatus for graphics processing is described. The apparatus may include a processor, memory coupled with the processor, and instructions stored in the memory. The instructions may be executable by the processor to cause the apparatus to receive an image including a set of pixels, render a first subset of pixels in each bin of a set of bins during a first rendering pass, defer rendering a second subset of pixels and a third subset of pixels in each bin of the set of bins during the first rendering pass, where the second subset of pixels includes edge pixels associated with the set of pixels and the third subset of pixels is between the first subset of pixels and the second subset of pixels, render the second subset of pixels and the third subset of pixels in each bin of the set of bins during a second rendering pass based on rendering the first subset of pixels, and output a representation of the image based on rendering the first subset of pixels during the first rendering pass and rendering the second subset of pixels and the third subset of pixels during the second rendering pass.

Another apparatus for graphics processing is described. The apparatus may include means for receiving an image including a set of pixels, rendering a first subset of pixels in each bin of a set of bins during a first rendering pass, deferring rendering a second subset of pixels and a third subset of pixels in each bin of the set of bins during the first rendering pass, where the second subset of pixels includes edge pixels associated with the set of pixels and the third subset of pixels is between the first subset of pixels and the second subset of pixels, rendering the second subset of pixels and the third subset of pixels in each bin of the set of bins during a second rendering pass based on rendering the first subset of pixels, and outputting a representation of the image based on rendering the first subset of pixels during the first rendering pass and rendering the second subset of pixels and the third subset of pixels during the second rendering pass.

A non-transitory computer-readable medium storing code for graphics processing at a device is described. The code may include instructions executable by a processor to receive an image including a set of pixels, render a first subset of pixels in each bin of a set of bins during a first rendering pass, defer rendering a second subset of pixels and a third subset of pixels in each bin of the set of bins during the first rendering pass, where the second subset of pixels includes edge pixels associated with the set of pixels and the third subset of pixels is between the first subset of pixels and the second subset of pixels, render the second subset of pixels and the third subset of pixels in each bin of the set of bins during a second rendering pass based on rendering the first subset of pixels, and output a representation of the image based on rendering the first subset of pixels during the first rendering pass and rendering the second subset of pixels and the third subset of pixels during the second rendering pass.

Some examples of the method, apparatuses, and non-transitory computer-readable medium described herein may further include operations, features, means, or instructions for segmenting the image into the set of bins based on a default bin size, where rendering the first subset of pixels during the first rendering pass and rendering the second subset of pixels and the third subset of pixels during the second rendering pass may be based on the default bin size.

Some examples of the method, apparatuses, and non-transitory computer-readable medium described herein may further include operations, features, means, or instructions for determining a bin size smaller than the default bin size, where segmenting the image into the set of bins includes, and segmenting the image into the set of bins based on the determined bin size, where rendering the first subset of pixels during the first rendering pass and rendering the second subset of pixels and the third subset of pixels during the second rendering pass may be based on the determined bin size smaller than the default bin size.

Some examples of the method, apparatuses, and non-transitory computer-readable medium described herein may further include operations, features, means, or instructions for applying a filter to the second subset of pixels for each bin of the set of bins, and determining the third subset of pixels for each bin of the set of bins based on a filter width of the filter.

In some examples of the method, apparatuses, and non-transitory computer-readable medium described herein, the third subset of pixels for each bin of the set of bins correspond to a region associated with the filter width.

Some examples of the method, apparatuses, and non-transitory computer-readable medium described herein may further include operations, features, means, or instructions for assigning each bin of the set of bins as an interior bin, where rendering the first subset of pixels during the first rendering pass and rendering the second subset of pixels and the third subset of pixels during the second rendering pass may be based on assigning each bin of the set of bins as the interior bin.

In some examples of the method, apparatuses, and non-transitory computer-readable medium described herein, rendering the first subset of pixels in each bin of a set of bins during the first rendering pass may include operations, features, means, or instructions for rendering the first subset of pixels per bin.

In some examples of the method, apparatuses, and non-transitory computer-readable medium described herein, rendering the second subset of pixels and the third subset of pixels in each bin of the set of bins during the second rendering pass may include operations, features, means, or instructions for rendering the second subset of pixels and the third subset of pixels jointly for all bins of the set of bins.

Some examples of the method, apparatuses, and non-transitory computer-readable medium described herein may further include operations, features, means, or instructions for outputting the rendered first subset of pixels to a resolve surface of a system memory of the device, and outputting the deferred second subset of pixels and the deferred third subset of pixels to a deferred surface of the system memory of the device.

Some examples of the method, apparatuses, and non-transitory computer-readable medium described herein may further include operations, features, means, or instructions for erasing a graphics memory of the device based on deferring the rendering of the second subset of pixels and the third subset of pixels, where erasing the graphics memory of the device may be performed per bin for the set of bins.

In some examples of the method, apparatuses, and non-transitory computer-readable medium described herein, the first subset of pixels in each bin of the set of bins include interior pixels of each bin of the set of bins.

In some examples of the method, apparatuses, and non-transitory computer-readable medium described herein, the second subset of pixels in each bin of the set of bins may be nonoverlapping with the first subset of pixels in each bin of the set of bins.

Some examples of the method, apparatuses, and non-transitory computer-readable medium described herein may further include operations, features, means, or instructions for rendering the second subset of pixels may be based on rendering the third subset of pixels.

DETAILED DESCRIPTION

Figure 1:
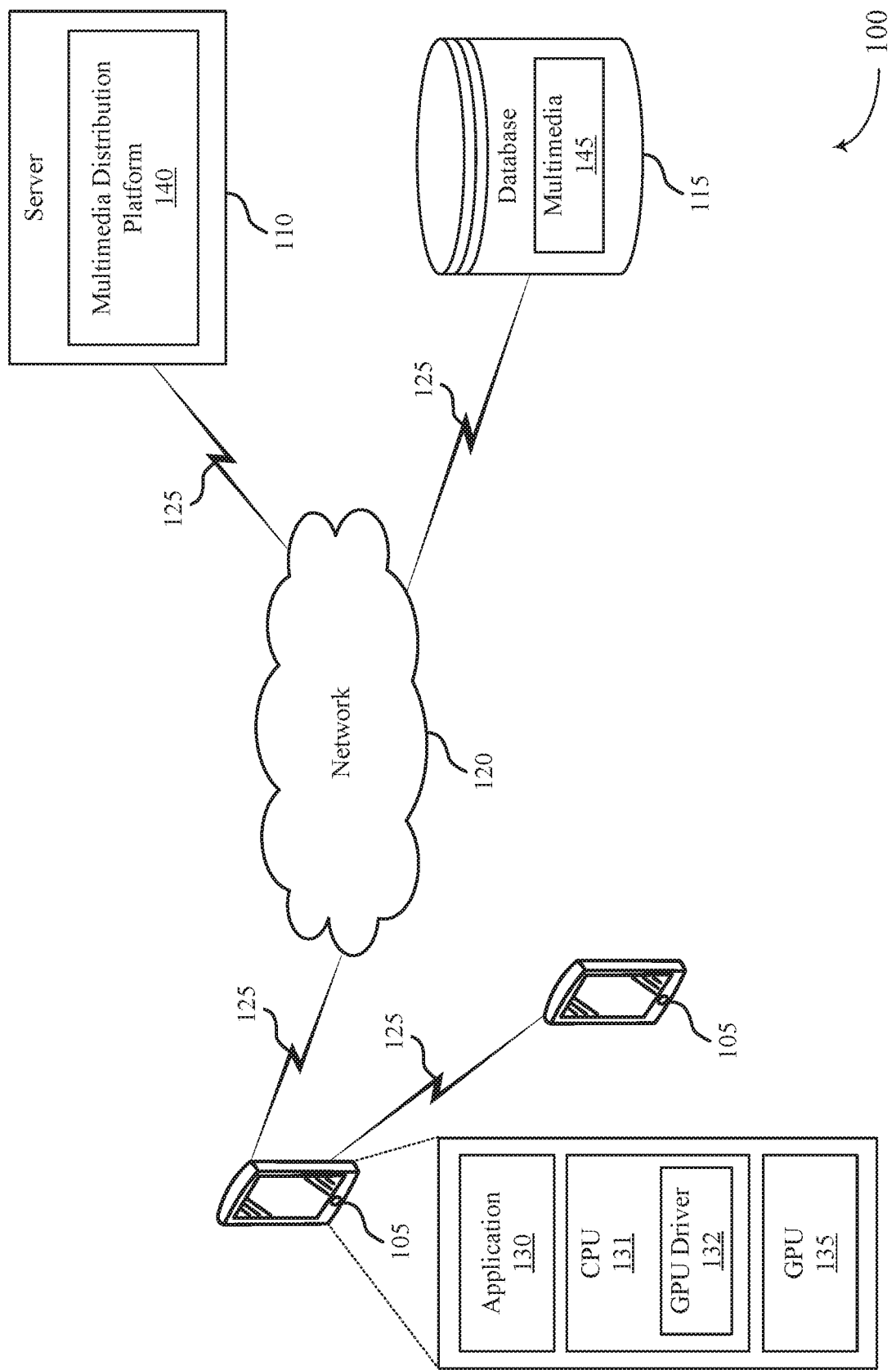
FIG. 1 illustrates an example of a multimedia system for graphics processing that supports bin filtering in accordance with aspects of the present disclosure.

A graphics processing unit (GPU) may represent one or more dedicated processors for performing graphical operations. The GPU may be a dedicated hardware unit having fixed function and programmable components for rendering graphics and executing GPU applications. Graphics languages may provide vector datatypes for performing matrix and vector operations, which may implement different transformations on vertices of shapes, such as polygons. The transformations may provide for simulations of physics as well graphical effects such as shading, lighting, texturing, shadows, etc.

As part of graphics rendering, a GPU may receive an image including a set of pixels and split the image into tiles (e.g., "tile-based rendering" or "binning"). For example, a GPU may be configured to split an image into tiles such that each tile making up the image scene may be stored within a dedicated fast memory buffer (e.g., a global memory (GMEM)) of the GPU. In processing the image utilizing tile-based rendering or binning, some graphics applications may support an expanded-bin mode to enable post rendering effects, such as filtering (e.g., using shader programs). In an expanded-bin mode, a GPU may expand each bin such that an extended portion of the bin overlaps with neighboring bins. In some cases, GPUs supporting the expanded-bin mode may incur various processing and memory overhead due to the processing and storage of overlapping pixels among the expanded bins. For example, the expanded-bin mode may result in increased vertex processing for overlapping primitives, increased fragment processing for overlapping fragments (e.g., overlapping pixels, overlapping fragments of pixels), increases in on-chip memory resources (e.g., central processing unit (CPU) memory) for storing the overlapping pixels, and reductions in GPU processing efficiency (e.g., shader processing efficiency).

Various aspects of the described techniques relate to configuring a device to support and provide bin filtering. A GPU may be configured to support post rendering effects such as filtering, without expanding bins utilized in tile-based rendering. For example, a GPU may receive an image including a set of pixels and segment the image into multiple bins. The GPU may render a first subset of pixels (e.g., interior pixels) in each bin of a set of bins during a first rendering pass. In some aspects, the GPU may defer rendering a second subset of pixels and a third subset of pixels in each bin of the set of bins during the first rendering pass. The GPU may render the second subset of pixels and the third subset of pixels in each bin of the set of bins during a second rendering pass based on rendering the first subset of pixels. In an example, the second subset of pixels may include edge pixels associated with the set of pixels. The edge pixels may be located at boundaries of each bin where the bin is adjacent another bin. In some aspects, the third subset of pixels is between the first subset of pixels and the second subset of pixels. Accordingly, the GPU may output a representation of the image based on two-pass rendering (e.g., the first and second rendering passes). The techniques described herein for two-pass rendering may utilize a smaller overhead compared to single-pass rendering, which utilizes an expanded-bin mode (e.g., applies a tile apron) for each bin.

The techniques described herein for two-pass rendering may utilize a smaller overhead compared to techniques for single-pass rendering utilizing an expanded-bin mode (e.g., applying a tile apron and expanding the bin size) for each bin. For example, an expanded-bin mode may involve processing and storage of overlapping pixels between bins and thereby increase usage of on-chip memory storage. A GPU utilizing the two-pass rendering techniques described herein may generate outputs based on available pixels inside each bin, reducing the amount of resource usage associated with storing and processing pixels.

Particular aspects of the subject matter described in this disclosure may be implemented to realize one or more of the following potential improvements, among others. The techniques employed by the device may provide benefits and enhancements to GPU rendering operations by the device. For example, operations performed by the device may provide improvements to tile-based rendering. In some examples, configuring the device to support bin filtering, among other examples in GPU systems, may support improvements in power consumption, resource usage, and reduced latency, among other benefits.

Aspects of the disclosure are initially described in the context of a multimedia system. Aspects of the disclosure are further illustrated by and described with reference to apparatus diagrams, system diagrams, and flowcharts that relate to bin filtering.

FIG. 1 illustrates an example of a multimedia system 100 that supports bin filtering in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports bin filtering, such as multimedia packets, multimedia data, or multimedia control information, via network 120 using communications links 125. In some cases, a portion or all of the techniques described herein supporting bin filtering may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia a (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130, a CPU 131, and a GPU 135. While, the multimedia system 100 illustrates the devices 105 including the application 130, the CPU 131, and the GPU 135, the application 130, the CPU 131, and the GPU 135 may be optional features for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The CPU 131 may be part of a general-purpose processor, a digital signal processor (DSP), an image signal processor (ISP), a CPU, a microcontroller, an application-specific integrated circuit (ASIC), a field-programmable gate array (FPGA), a system-on-chip (SOC), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. In some cases, a GPU driver 132 may be integrated into the CPU 131. The GPU driver 132 may be an example of the GPU driver 220 described herein.

The GPU driver 132 may process multimedia (e.g., image data, video data, audio data) from and/or write multimedia data to a local memory of the device 105 or to the database 115. For example, the GPU driver 132 may be configured to process multimedia data (e.g., shader programs) to support bin filtering, according to the techniques described herein. The GPU driver 132 may formulate commands that specify operations for the GPU 135 to perform in order to render a set of pixels (e.g., primitives of the pixels). In some aspects, the GPU driver 132 may modify rendering commands to utilize a fast bin buffer (e.g., a fast memory buffer, such as GMEM or GPU memory) or a system memory based on a rendering pass performed by the GPU 135.

The GPU 135 may be part of a general-purpose processor, a DSP, an ISP, a CPU, a microcontroller, an ASIC, an FPGA), an SOC, a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the GPU 135 may process multimedia (e.g., image data, video data, audio data) from and/or write multimedia data to a local memory of the device 105 or to the database 115. The GPU 135 may be configured to utilize bin filtering for processing images, according to the techniques described herein. The GPU 135 may be integrated with a multimedia manager of the device 105, for example, multimedia manager 415, multimedia manager 515, or multimedia manager 710 described herein.

The multimedia system 100 may support and provide techniques for bin filtering. For example, the device 105 may receive an image including a set of pixels and segment the image into multiple bins. The device 105 may render a first subset of pixels (e.g., interior pixels) in each bin of a set of bins during a first rendering pass. In some aspects, the device 105 may defer rendering a second subset of pixels and a third subset of pixels in each bin of the set of bins during the first rendering pass. The device 105 may render the second subset of pixels and the third subset of pixels in each bin of the set of bins during a second rendering pass based on rendering the first subset of pixels. In some examples, the second subset of pixels may include edge pixels associated with the set of pixels. The edge pixels may be located at boundaries of each bin where the bin is adjacent another bin. In some examples, the third subset of pixels may be between the first subset of pixels and the second subset of pixels. Accordingly, the device 105 may output a representation of the image based on two-pass rendering (e.g., the first and second rendering passes). The techniques described herein for two-pass rendering may utilize a smaller overhead compared to single-pass rendering, which utilizes an expanded-bin mode (e.g., applies a tile apron) for each bin.

The server 110 may be a data server, a cloud server, a server associated with a multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery medium, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support bin filtering associated with the multimedia 145. The device 105 may retrieve the stored data from the database 115 via the network 120 using communications links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The communications links 125 may transmit bidirectional communications and/or unidirectional communications. In some examples, the communications links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The multimedia system 100 may thus provide improvements in bin filtering. The multimedia system 100 may also provide benefits and enhancements to the operation of the devices 105. For example, the devices 105 may be configured to segment a received image into the set of bins based on a default bin size (e.g., without expanding the bin size). The devices 105 may render the first subset of pixels during the first rendering pass and render the second subset of pixels and the third subset of pixels during the second rendering pass based on the default bin size (e.g., without expanding the bin size), which may improve operational characteristics such as power consumption, processor utilization (e.g., DSP, CPU, GPU, ISI' processing utilization), higher program execution speed, and memory usage of the devices 105. The devices 105 may also be configured to provide bin filtering and rendering passes utilizing a bin size smaller than the default bin size, having advantages of reduced memory usage and reduced latency (e.g., GPU compile times) compared to single-pass rendering which utilizes an expanded-bin mode (e.g., applies a tile apron) for each bin.

Figure 2:
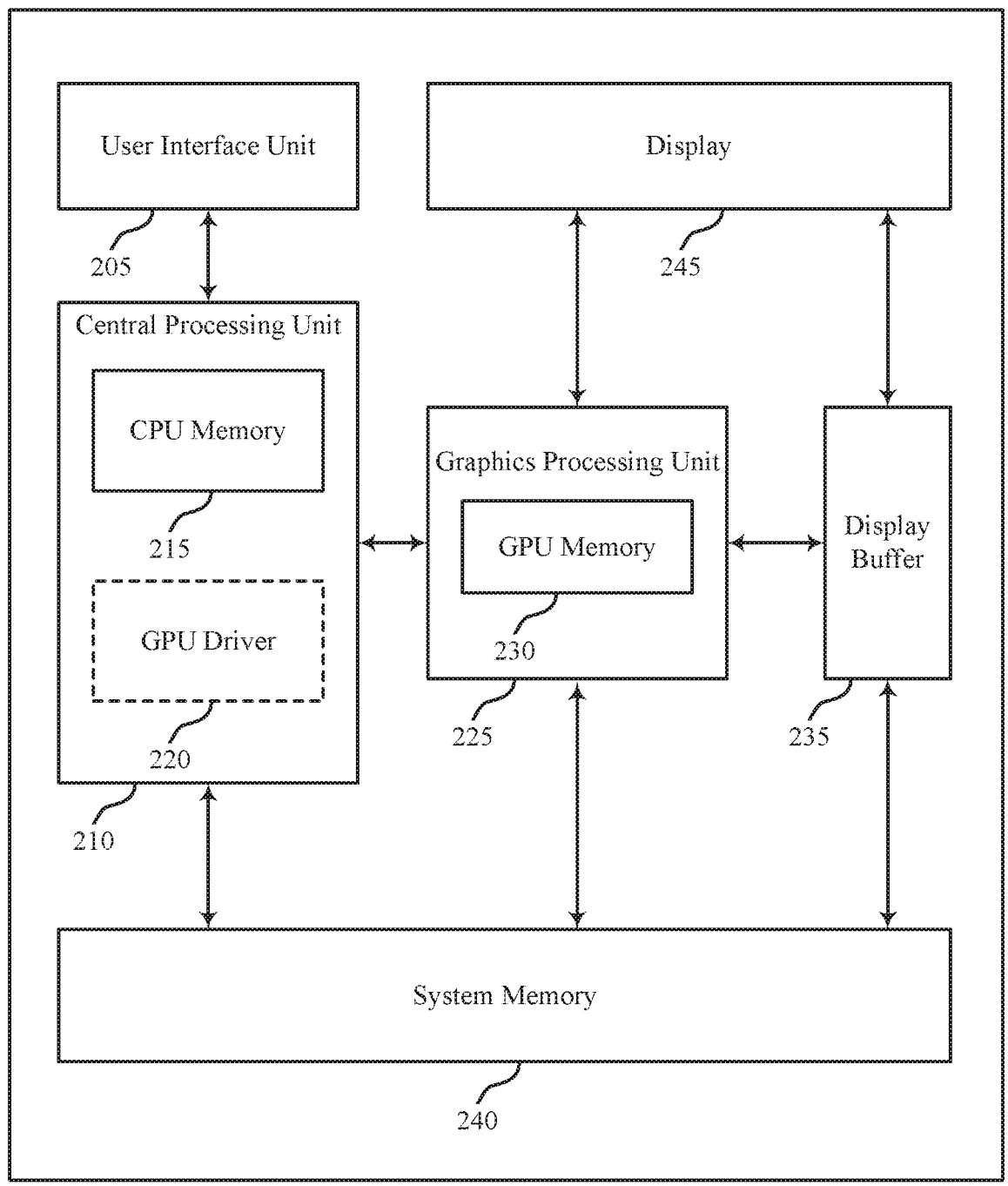
FIG. 2 illustrates an example of a device that supports bin filtering in accordance with aspects of the present disclosure.

FIG. 2 illustrates an example of a device 200 that supports bin filtering in accordance with aspects of the present disclosure. In some examples, the device 200 may implement aspects of the multimedia system 100. For example, the device 200 may implement aspects of bin filtering performed by a device 105 as described with reference to FIG. 1. Examples of the device 200 include, but are not limited to, wireless devices, mobile or cellular telephones, including smartphones, personal digital assistants (PDAs), video gaming consoles that include video displays, mobile video gaming devices, mobile video conferencing units, laptop computers, desktop computers, televisions set-top boxes, tablet computing devices, e-book readers, fixed or mobile media players, and the like.

In the example of FIG. 2, the device 200 may include a central processing unit (CPU) 210 having CPU memory 215, a GPU 225 having GPU memory 230, a display 245, a display buffer 235 storing data associated with rendering, a user interface unit 205, and a system memory 240. For example, the system memory 240 may store a GPU driver 220 (illustrated as being contained within the CPU 210 as described herein) having a compiler, a GPU program, a locally-compiled GPU program, and the like. The user interface unit 205, CPU 210, GPU 225, display buffer 235, system memory 240, and display 245 may communicate with each other (e.g., using a system bus).

Examples of the CPU 210 include, but are not limited to, a DSP, general purpose microprocessor, ASIC, an FPGA, or other equivalent integrated or discrete logic circuitry. Although the CPU 210 and the GPU 225 are illustrated as separate units in the example of FIG. 2, in some examples, the CPU 210 and GPU 225 may be integrated into a single unit. The CPU 210 may execute one or more software applications. Examples of the applications may include operating systems, word processors, web browsers, e-mail applications, spreadsheets, video games, audio and/or video capture, playback or editing applications, or other such applications that initiate the generation of image data to be presented via the display 245. As illustrated, the CPU 210 may include CPU memory 215. For example, the CPU memory 215 may represent on-chip storage or memory used in executing machine or object code. The CPU memory 215 may include one or more volatile or non-volatile memories or storage devices, such as flash memory, a magnetic data media, an optical storage media, etc. The CPU 210 may be able to read values from or write values to the CPU memory 215 more quickly than reading values from or writing values to the system memory 240, which may be accessed, e.g., over a system bus.

In some examples, the GPU 225 may be an example of aspects of the GPU 135 described herein. The GPU 225 may represent one or more dedicated processors for performing graphical operations. That is, for example, the GPU 225 may be a dedicated hardware unit having fixed function and programmable components for rendering graphics and executing GPU applications. The GPU 22.5 may also include a DSP, a general purpose microprocessor, an ASIC, an FPGA, or other equivalent integrated or discrete logic circuitry. The GPU 225 may be built with a highly-parallel structure that provides more efficient processing of complex graphic-related operations than the CPU 210. For example, the GPU 225 may include a plurality of processing elements that are configured to operate on multiple vertices or pixels in a parallel manner. The highly parallel nature of the GPU 225 may allow the GPU 225 to generate graphic images (e.g., graphical user interfaces and two-dimensional or three-dimensional graphics scenes) for the display 245 more quickly than the CPU 210.

The GPU 225 may, in some instances, be integrated into a motherboard of device 200. In other instances, the GPU 225 may be present on a graphics card that is installed in a port in the motherboard of the device 200 or may be otherwise incorporated within a peripheral device configured to interoperate with the device 200. As illustrated; the GPU 225 may include GPU memory 230. For example, the GPU memory 230 may represent on-chip storage or memory used in executing machine or object code. GPU memory 230 may include one or more volatile or non-volatile memories or storage devices, such as flash memory, a magnetic data media, an optical storage media, etc. The GPU 225 may be able to read values from or write values to the GPU memory 230 more quickly than reading values from or writing values to system memory 240, which may be accessed, e.g., over a system bus. That is, the GPU 225 may read data from and write data to the GPU memory 230 without using the system bus to access off-chip memory. This operation may allow the GPU 225 to operate in a more efficient manner by reducing operations for the GPU 225, such as to read and write data via the system bus, which may experience heavy bus traffic.

The display 245 represents a unit capable of displaying video, images, text or any other type of data for consumption by a viewer. The display 245 may include a liquid-crystal display (LCD), a light emitting diode (LED) display, an organic LED (OLED), an active-matrix OLED (AMOLED), or the like. The display buffer 235 represents a memory or storage device dedicated to storing data for presentation of imagery, such as computer-generated graphics, still images, video frames; or the like for the display 245. The display buffer 235 may represent a two-dimensional buffer that includes a plurality of storage locations. The number of storage locations within the display buffer 235 may, in some cases, correspond to the number of pixels to be displayed on the display 245. For example; if the display 245 is configured to include 640×480 pixels, the display buffer 235 may include 640×480 storage locations storing pixel color and intensity information, such as red, green, and blue pixel values, or other color values. The display buffer 235 may store the final pixel values for each of the pixels processed by GPU 225. The display 245 may retrieve the final pixel values from the display buffer 235 and display the final image based on the pixel values stored in the display buffer 235.

The user interface unit 205 represents a unit with which a user may interact with or otherwise interface to communicate with other units of the device 200, such as the CPU 210. Examples of the user interface unit 205 include, but are not limited to, a trackball, a mouse, a keyboard, and other types of input devices. The user interface unit 205 may also be, or include, a touch screen and the touch screen may be incorporated as part of the display 245. In some cases, the user interface unit 205 may be an example of the I/O controller 715 as described with reference to FIG. 7.

The system memory 240 may comprise one or more computer-readable storage media. Examples of the system memory 240 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. The system memory 240 may store program modules and/or instructions that are accessible for execution by CPU 210. Additionally, the system memory 240 may store user applications and application surface data associated with the applications. The system memory 240 may in some cases store information for use by and/or information generated by other components of device 200. For example, the system memory 240 may act as a device memory for the GPU 225 and may store data to be operated on by the GPU 225 as well as data resulting from operations performed by the GPU 225.

In some examples, the system memory 240 may include instructions that cause the CPU 210 or GPU 225 to perform the functions ascribed to the CPU 210 or GPU 225 in aspects of the present disclosure. The system memory 240 may, in some examples, be considered as a non-transitory storage medium. The term "non-transitory" should not be interpreted to mean that the system memory 240 is non-movable. As one example, the system memory 240 may be removed from device 200 and moved to another device. As another example, a system memory substantially similar to the system memory 240 may be inserted into the device 200. In some examples, a non-transitory storage medium may store data that can, over time, change (e.g., in RAM).

The system memory 240 may store a GPU driver 220 and compiler, a GPU program, and a locally-compiled GPU program. The GPU driver 220 may represent a computer program or executable code that provides an interface to access the GPU 225. The CPU 210 may execute the GPU driver 220 or portions thereof to interface with the GPU 22.5 and, for this reason, the GPU driver 220 is shown in the example of FIG. 2 within the CPU 210. The GPU driver 220 may be accessible to programs or other executables executed by the CPU 210, including the GPU program stored in the system memory 240. Thus, when one of the software applications executing on the CPU 210 might be ready for graphics processing, the CPU 210 may provide graphics commands and graphics data to the GPU 225 for rendering to the display 245 (e.g., via the GPU driver 220).

In some cases, the GPU program may include code written in a high level (HL) programming language, e.g., using an API. Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of a GPU 225 to execute commands without user knowledge as to the specifics of the hardware components. In order to process the graphics rendering instructions, the CPU 210 may issue one or more rendering commands to the GPU 225 (e.g., through the GPU driver 220) to cause the GPU 225 to perform some or all of the rendering of the graphics data. In some examples, the graphics data to be rendered may include a list of graphics primitives (e.g., points, lines, triangles, quadrilaterals, etc.).

The GPU program stored in the system memory 240 may invoke or otherwise include one or more functions provided by the GPU driver 220. The CPU 210 executes the program in which the GPU program is embedded and, upon encountering the GPU program, passes the GPU program to the GPU driver 220. The CPU 210 executes the GPU driver 220 in this context to process the GPU program. That is, for example, the GPU driver 220 may process the GPU program by compiling the GPU program into object or machine code executable by the GPU 225. This object code may be referred to as a locally-compiled GPU program.

In some examples, a compiler associated with the GPU driver 220 may operate in real-time or near-real-time to compile the GPU program during the execution of the program in which the GPU program is embedded. For example, the compiler represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, CPU 210 and GPU 225).

In the example of FIG. 2, the compiler may receive the GPU program from CPU 210 when executing HL code that includes the GPU program. That is, a software application being executed by CPU 210 may invoke GPU driver 220 (e.g., via a graphics API) to issue one or more commands to CPU 225 for rendering one or more graphics primitives into displayable graphics images. The compiler may compile the GPU program to generate the locally-compiled GPU program that conforms to a LL programming language. The compiler may then output the locally-compiled GPU program that includes the LL instructions. In some examples, the LL instructions may be provided to GPU 225 in the form a list of drawing primitives (e.g., triangles, rectangles, etc.).

The LL instructions (e.g., which may alternatively be referred to as primitive definitions) may include vertex specifications that specify one or more vertices associated with the primitives to be rendered. The vertex specifications may include positional coordinates for each vertex and, in some instances, other attributes associated with the vertex, such as color coordinates, normal vectors, and texture coordinates. The primitive definitions may include primitive type information, scaling information, rotation information, and the like. Based on the instructions issued by the software application (e.g., the program in which the GPU program is embedded), GPU driver 220 may formulate one or more commands that specify one or more operations for GPU 225 to perform in order to render the primitive. When GPU 225 receives a command from CPU 210, it may decode the command and configure one or more processing elements to perform the specified operation and may output the rendered data to display buffer 235.

GPU 225 generally receives the locally-compiled GPU program, and then, in some instances, GPU 225 renders one or more images and outputs the rendered images to display buffer 235. For example, GPU 225 may generate a number of primitives to be displayed at display 245. Primitives may include one or more of a line (including curves, splines, etc.), a point, a circle, an ellipse, a polygon (e.g., a triangle), or any other two-dimensional primitive. The term "primitive" may also refer to three-dimensional primitives, such as cubes, cylinders, sphere, cone, pyramid, torus, or the like. Generally, the term "primitive" refers to any basic geometric shape or element capable of being rendered by GPU 225 for display as an image (or frame in the context of video data) via display 245. GPU 22.5 may transform primitives and other attributes (e.g., that define a color, texture, lighting, camera configuration, or other aspect) of the primitives into a so-called "world space" by applying one or more model transforms.

A GPU 225 may include a dedicated fast bin buffer (e.g., a fast memory buffer, such as GMEM, which may be referred to by GPU memory 230). As discussed herein, a rendering surface may be segmented into bins. In some cases, the bin size may be determined by format (e.g., pixel color and depth information) and render target resolution segmented by the total amount of GMEM. The number of bins may vary based on device 200 hardware, target resolution size, and target display format. A rendering pass may draw (e.g., render, write, etc.) pixels into GMEM (e.g., with a bandwidth that matches the capabilities of the GPU), The GPU 225 may then resolve the GMEM (e.g., burst write blended pixel values from the GMEM, as a single layer, to a display buffer 235 or a frame buffer in system memory 240). Such may be referred to as bin-based or tile-based rendering. When all bins are complete, the driver may swap buffers and start the binning process again for a next frame.

For example, CPU 225 may implement a tile-based architecture that renders an image or rendering target by breaking the image into multiple portions, referred to as tiles or bins. The bins may be sized based on the size of GPU memory 230 (e.g., which may alternatively be referred to herein as GMEM or a cache), the resolution of display 245, the color or Z precision of the render target, etc. When implementing tile-based rendering, GPU 225 may perform a binning pass and one or more rendering passes. For example, with respect to the binning pass, GPU 225 may process an entire image and sort rasterized primitives into bins.

The device 200 may, in some examples, receive an image including a set of pixels and segment the image into multiple bins via the GPU 225. The device 200 may render a first subset of pixels (e.g., interior pixels) in each bin of a set of bins during a first rendering pass. The device 200 may defer rendering a second subset of pixels and a third subset of pixels in each bin of the set of bins during the first rendering pass. The device 200 may render the second subset of pixels and the third subset of pixels in each bin of the set of bins during a second rendering pass via the GPU 225 and based on rendering the first subset of pixels. In some examples, the second subset of pixels may include edge pixels associated with the set of pixels. The edge pixels may be located at boundaries of each bin where the bin is adjacent to another bin. In some examples, the third subset of pixels may be between the first subset of pixels and the second subset of pixels. The device 200 may, as a result, output a representation of the image, via the display 245, based on two-pass rendering (e.g., the first and second rendering passes).

Figure 3:
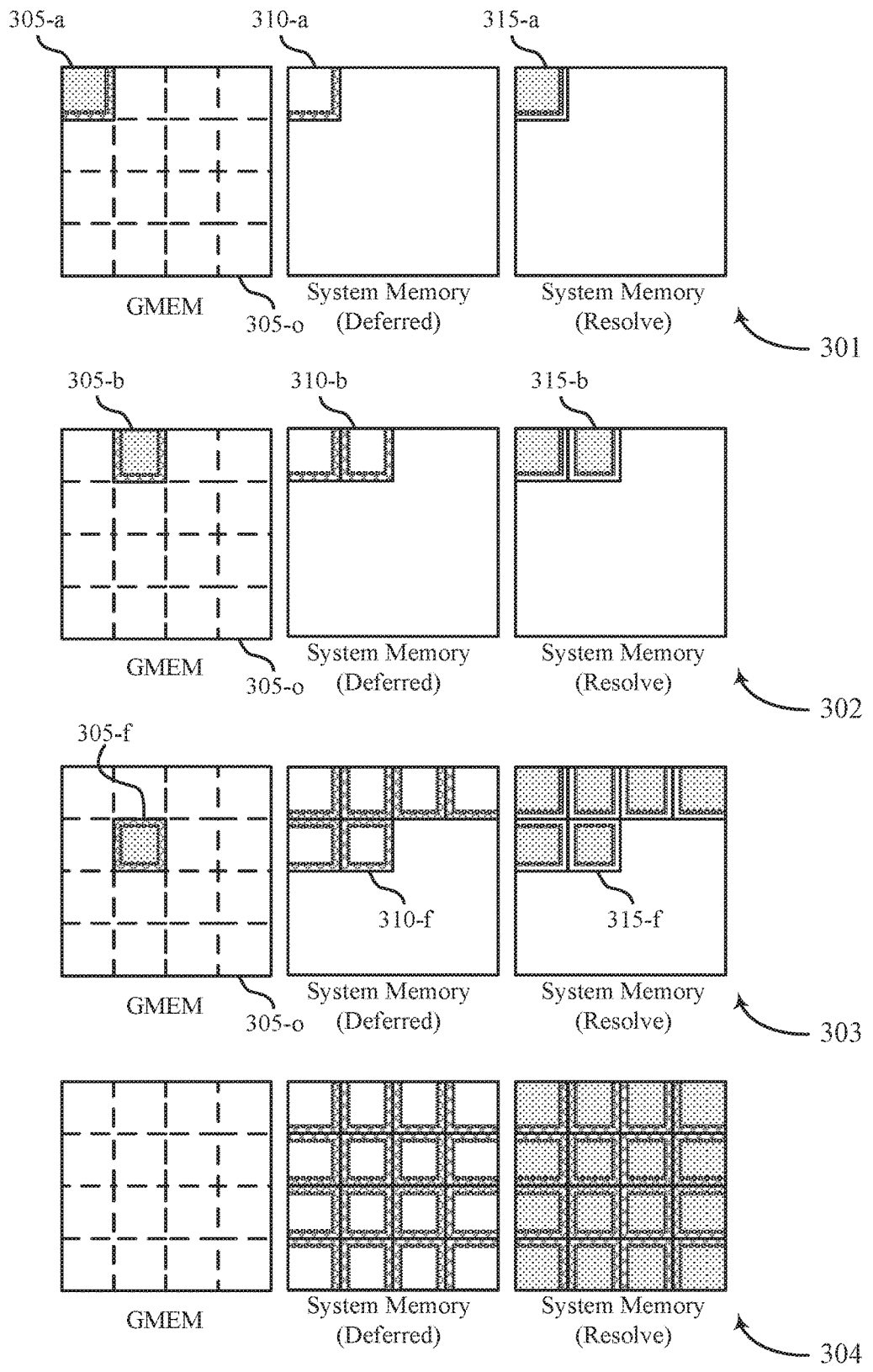
FIG. 3 illustrates examples of graphics processing operations that support bin filtering in accordance with aspects of the present disclosure.

FIG. 3 illustrates examples of graphics processing operations 301 through 304 that support bin filtering in accordance with aspects of the present disclosure. The graphics processing operations 301 through 304 may implement aspects of the multimedia system 100 as described with reference to FIG. 1. For example, the graphics processing operations 301 through 304 may be based on a GPU configuration, and implemented by a device as described with reference to FIGS. 1 and 4 through 7. The graphics processing operations 301 through 304 may provide improvements to power consumption for a device and, in some examples, may promote higher reliability and lower latency for graphics processing, among other benefits.

In the following description of the graphics processing operations 301 through 304, the graphics processing operations 301 through 304 may be performed in a different order than the example order shown, or the graphics processing operations 301 through 304 may be performed in different orders or at different times. Some graphics processing operations 301 through 304 may also be omitted, and other graphics operations may be added to the graphics processing operations 301 through 304.

A device, such as a device 105 or a device 200, or both, may perform multiple rendering passes for rendering an image according to the graphics processing operations 301 through 304. The device may segment an image into a set of bins 305 (e.g., bins 305-a through bin 305-o). In some examples, the device may segment the image into the set of bins 305 based on a default bin size. The device may set the default bin size, for example, based on resources of the device (e.g., memory, processor capability, hardware, target resolution size, or the like). In some aspects, the device may set the default bin size based on a performance threshold associated with rendering the image. In some other aspects, the device may set the default bin size based on pixel data of the image.

In the example of FIG. 3, the device may render a first subset of pixels in each bin of the set of bins 305 (e.g., per bin 305) during a first rendering pass. In an example, the device may render pixels 320 in each bin 305 during the first rendering pass. The pixels 320 may be referred to, for example, as interior pixels. The device may render the image based on a sequential order associated with the bins 305 (e.g., bin 305-a through bin 305-o). For example, the device may render the pixels 320 per bin 305 based on the sequential order. In some aspects, the device may render the image (e.g., render the pixels 320 per bin 305) based on an order different from the sequential order.

As part of the first rendering pass, the device may output the rendered first subset of pixels of each bin 305 to a resolve surface of a system memory of the device. For example, referring to the graphics processing operation 301, the device may output rendered pixels 320 of bin 305-a to the resolve surface of the system memory of the device, as shown at 315-a. Referring to graphics processing operation 302, the device may output rendered pixels 320 of bin 305-b to the resolve surface of the system memory of the device, as shown at 315-b. Referring to graphics processing operation 303, the device may output rendered pixels 320 of bin 305-f to the resolve surface of the system memory of the device, as shown at 315-f.

In some examples, the device may erase a portion of the system memory of the device as part of the first rendering pass. For example, the device may erase (e.g., clear) a portion of the system memory associated with a deferred surface as part of initiating the first rendering pass (e.g., prior to rendering pixels of bin 305-a). In some other examples, the device may erase a portion of the graphics memory of the device (e.g., GMEM) as part of the first rendering pass. For example, as part of the first rendering pass, the device may erase (e.g., clear) the graphics memory of the device prior to rendering pixels of each bin 305 (e.g., per bin 305). In an example, as part of the first rendering pass, the device may erase (e.g., clear) the graphics memory of the device based on (e.g., after) deferring rendering pixels of each bin 305 (e.g., per bin 305). Examples of aspects of deferring rendering of pixels are described herein.

During the first rendering pass, the device may defer rendering a second subset of pixels in each bin of the set of bins 305 (e.g., per bin 305). In an example, the device may defer rendering pixels 325 of each bin 305 during the first rendering pass. The pixels 325 may be referred to, for example, as edge pixels. The pixels 325 (e.g., edge pixels) may be located at boundaries (e.g., sides) of each bin 305 where the bin 305 is adjacent another bin. For example, edge pixels of bin 305-a may be located at two boundaries of bin 305-a, edge pixels of bin 305-b may be located at three boundaries of bin 305-b, and edge pixels of bin 305-c may be located at four boundaries of bin 305-c. The device may defer rendering of the pixels 325 (e.g., edge pixels) per bin 305, for example, based on the sequential order associated with processing the bins 305 (e.g., bin 305-a through bin 305-o). In some aspects, the device may defer rendering of the pixels 325 per bin 305 based on an order different than the examples described herein.

The second subset of pixels in each bin 305 may be nonoverlapping with the first subset of pixels in each bin 305. For example, pixels 325 (e.g., edge pixels) of a bin 305 (e.g., bin 305-a) may be nonoverlapping with pixels 320 (e.g., interior pixels) of the same bin 305. In some other aspects, the second subset of pixels in a bin 305 may be nonoverlapping with the second subset of pixels in a different bin 305. For example, pixels 325 of a bin 305 (e.g., bin 305-a) may be nonoverlapping with pixels 325 of a different bin 305 (e.g., bin 305-b).

The device may determine the pixels 325 (e.g., edge pixels) based on a filter applied to each bin 305. For example, the device may apply a filter to each bin 305 and determine the pixels 325 within each bin 305 based on a filter width of the filter. In an example aspect, one or more dimensions of a region of each bin 305 may be determined by, the device based on the filter width. In some aspects, the pixels 325 may be included within the regions. In some aspects, the device may defer rendering of the pixels 325 during the first pass.

As part of the first rendering pass, the device may output the deferred second subset of pixels of each bin 305 to a deferred surface of a system memory of the device. For example, referring to graphics processing operation 301, the device may output deferred pixels 325 (e.g., edge pixels) of bin 305-a to the deferred surface of the system memory of the device, as shown at 310-a. Referring to the graphics processing operation 302, the device may output deferred pixels 325 of bin 305-b to the deferred surface of the system memory of the device, as shown at 310-b. Referring to the graphics processing operation 303, the device may output deferred pixels 325 of bin 305-*f* to the deferred surface of the system memory of the device, as shown at 310-*f*.

In some aspects, during the first rendering pass, the device may defer rendering a third subset of pixels in each bin of the set of bins 305 (e.g., per bin 305). In an example, the device may defer rendering pixels 330 of each bin 305 during the first rendering pass. The pixels 330 may be referred to, for example, as helper pixels. The device may defer rendering of the pixels 330 (e.g., helper pixels) per bin 305, for example, based on the sequential order associated with processing the bins 305 (e.g., bin 305-*a* through bin 305-*o*). In some aspects, the device may defer rendering of the pixels 330 per bin 305 based on an order different than the examples described herein.

In some aspects, the pixels 330 (e.g., helper pixels) may be between the pixels 320 (e.g., interior pixels) and the pixels 325 (e.g., edge pixels). For example, the pixels 330 may neighbor (e.g., be adjacent) both the pixels 320 (e.g., interior pixels) and the pixels 325 (e.g., edge pixels). The pixels 330 (e.g., helper pixels) may include image data associated with rendering the pixels 325 (e.g., edge pixels). For example, rendering the pixels 325 may be dependent on image data of the pixels 330. For example, the device may render the pixels 325 based on rendering the pixels 330.

In an example aspect, the device may determine the pixels 330 (e.g., helper pixels) based on the filter applied to each bin 305 with respect to the pixels 325 (e.g., edge pixels). For example, the device may apply the filter to each bin 305 and determine the pixels 330 (e.g., helper pixels) within each bin 305 based on the filter width of the filter. In an example aspect, for the regions of each bin 305 determined by the device based on the filter width, the pixels 330 (e.g., helper pixels) may be included within the region. In some aspects, the device may defer rendering of the pixels 330 during the first pass.

In example, as part of the first rendering pass, the device may output the deferred third subset of pixels of each bin 305 to the deferred surface of the system memory of the device. For example, referring to the graphics processing operation 301, the device may output deferred pixels 330 (e.g., helper pixels) of bin 305-*a* to the deferred surface of the system memory of the device, as shown at 310-*a*. Referring to the graphics processing operation 302, the device may output deferred pixels 330 of bin 305-*b* to the deferred surface of the system memory of the device, as shown at 310-*b*. Referring to the graphics processing operation 303, the device may output deferred pixels 330 of bin 305-*f* to the deferred surface of the system memory of the device, as shown at 310-*f*.

In some aspects, with reference to graphics processing operation 304, the device may render the second subset of pixels (e.g., pixels 325) during a second rendering pass. In some other aspects, the device may render the third subset of pixels (e.g., pixels 330) during the second rendering pass. In an example, as part of the second rendering pass, the device may render the second subset of pixels and the third subset of pixels jointly for all bins 305. For example, the device may render the deferred pixels 325 (e.g., edge pixels) and the deferred pixels 330 (e.g., helper pixels) jointly for all bins 305.

In an example aspect, the device may render the first subset of pixels during the first rendering pass based on the default bin size for segmenting the image into the set of bins 305 (e.g., bin 305-*a* through bin 305-*o*). For example, the device may render pixels 320 (e.g., interior pixels) in each bin 305 without utilizing an expanded-bin mode (e.g., without expanding the default bin size for each bin 305, without applying a tile apron). In another example aspect, the device may render the second subset of pixels and the third subset of pixels during the second rendering pass based on the default bin size. For example, the device may render pixels 325 (e.g., edge pixels) and pixels 330 (e.g., helper pixels) in each bin 305 without utilizing the expanded-bin mode. Accordingly, the device may generate the representation of the image based on available pixels inside each bin 305. The device may output a representation of an image based on rendering the first subset of pixels (e.g., pixels 320) during the first rendering pass and rendering the second subset of pixels (e.g., pixels 325) and the third subset of pixels (e.g., pixels 330) during the second rendering pass.

In some other aspects, the device may determine a bin size smaller than the default bin size. The device may segment the image into the set of bins 305 based on the determined bin size (e.g., the smaller bin size). In an example, the device may render the first subset of pixels during the first rendering pass based on the smaller bin size (e.g., which may exclude the second subset of pixels and third subset of pixels), and defer rendering of the second subset of pixels and third subset of pixels based on the smaller bin size. For example, the device may render pixels 320 (e.g., interior pixels) in each bin 305 during the first rendering pass based on the smaller bin size (e.g., which may exclude the pixels 330 and pixels 325), and defer rendering of the pixels 325 (e.g., edge pixels) and pixels 330 (e.g., helper pixels) based on the smaller bin size.

In another example, the device may render the second subset of pixels and the third subset of pixels during the second rendering pass based on the determined bin size (e.g., the smaller bin size). For example, the device may render pixels 325 (e.g., edge pixels) and pixels 330 (e.g., helper pixels) of each bin 305 based on the deferred rendering of the pixels 325 and pixels 330 (e.g., as deferred based on the smaller bin size).

In some other aspects, as part of the first rendering pass and the second rendering pass, the device may assign each bin 305 as an interior bin (e.g., a bin 305 surrounded on four sides by neighboring bins 305). Referring to FIG. 3, bin 305-*f* may be an example of an interior bin. In an example, the device may render the first subset of pixels during the first rendering pass and render the second subset of pixels and the third subset of pixels during the second rendering pass based on assigning each bin 305 as an interior bin. For example, the device may render pixels 320 (e.g., interior pixels) during the first rendering pass based on assigning each bin 305 as an interior bin. In some examples, the device may render pixels 325 (e.g., edge pixels) and pixels 330 (e.g., helper pixels) during the second rendering pass based on assigning each bin 305 as an interior bin.

Figure 4:
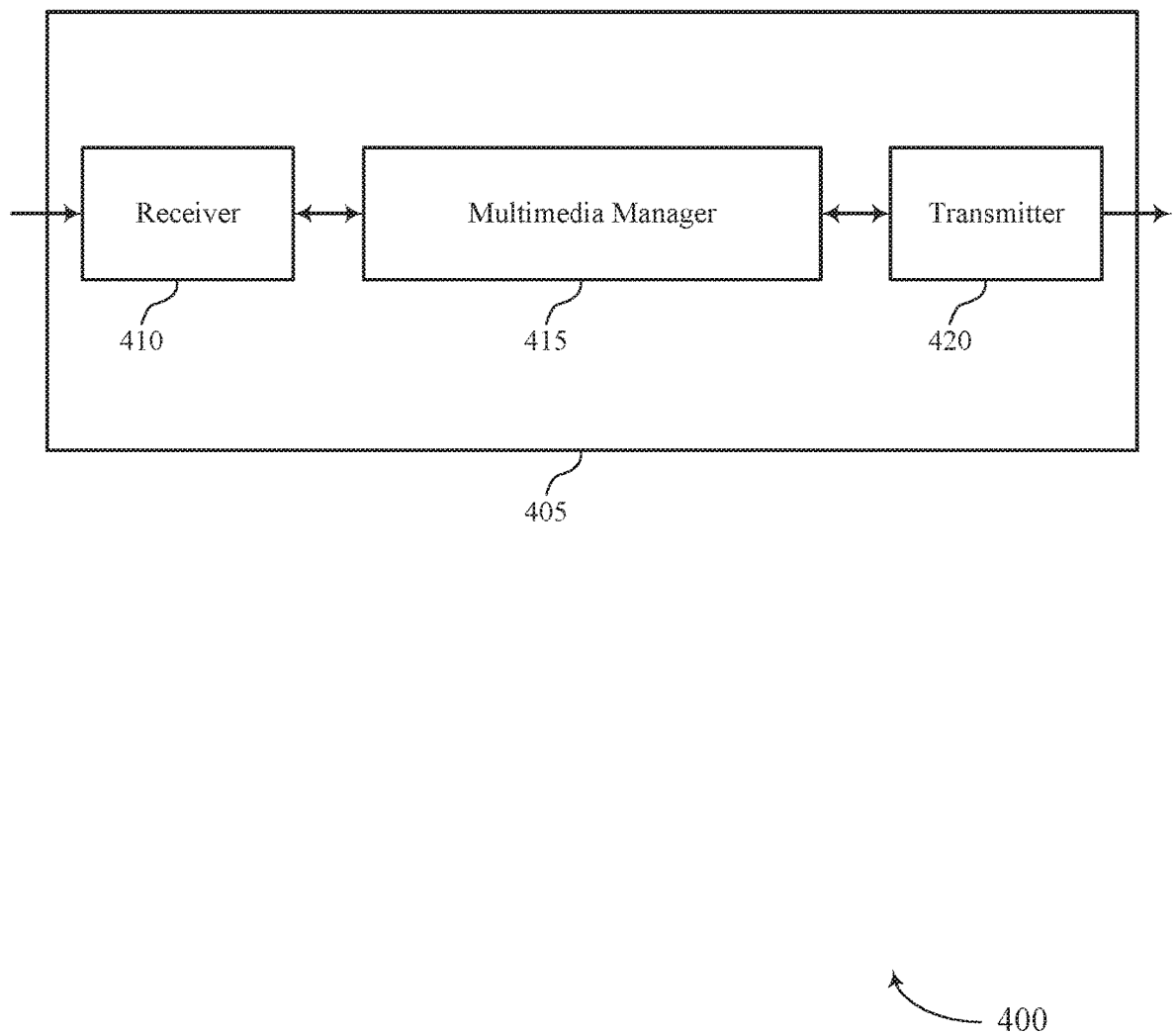
FIGS. 4 and 5 show block diagrams of devices that support bin filtering in accordance with aspects of the present disclosure.

FIG. 4 shows a block diagram 400 of a device 405 that supports bin filtering in accordance with aspects of the present disclosure. The device 405 may be an example of aspects of a device as described herein. The device 405 may include a receiver 410, a multimedia manager 415, and a transmitter 420. The device 405 may also include a processor. Each of these components may be in communication with one another (e.g., via one or more buses). One or more of these components may be means for supporting bin filtering.

The receiver 410 may receive information such as packets, user data, or control information associated with various information channels (e.g., control channels, data channels, and information related to bin filtering, etc.). Information may be passed on to other components of the device 405.

The receiver 410 may be an example of aspects of the transceiver 720 described with reference to FIG. 7. The receiver 410 may utilize a single antenna or a set of antennas.

The multimedia manager 415 may receive an image including a set of pixels, render a first subset of pixels in each bin of a set of bins during a first rendering pass, render the second subset of pixels and the third subset of pixels in each bin of the set of bins during a second rendering pass based on rendering the first subset of pixels, defer rendering a second subset of pixels and a third subset of pixels in each bin of the set of bins during the first rendering pass, where the second subset of pixels includes edge pixels associated with the set of pixels and the third subset of pixels is between the first subset of pixels and the second subset of pixels, and output a representation of the image based on rendering the first subset of pixels during the first rendering pass and rendering the second subset of pixels and the third subset of pixels during the second rendering pass. The multimedia manager 415 may be an example of aspects of the multimedia manager 710 described herein.

The multimedia manager 415, or its sub-components, may be implemented in hardware, code (e.g., software or firmware) executed by a processor, or any combination thereof. If implemented in code executed by a processor, the functions of the multimedia manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The multimedia manager 415, or its sub-components, may be physically located at various positions, including being distributed such that portions of functions are implemented at different physical locations by one or more physical components. In some examples, the multimedia manager 415, or its sub-components, may be a separate and distinct component in accordance with various aspects of the present disclosure. In some examples, the multimedia manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
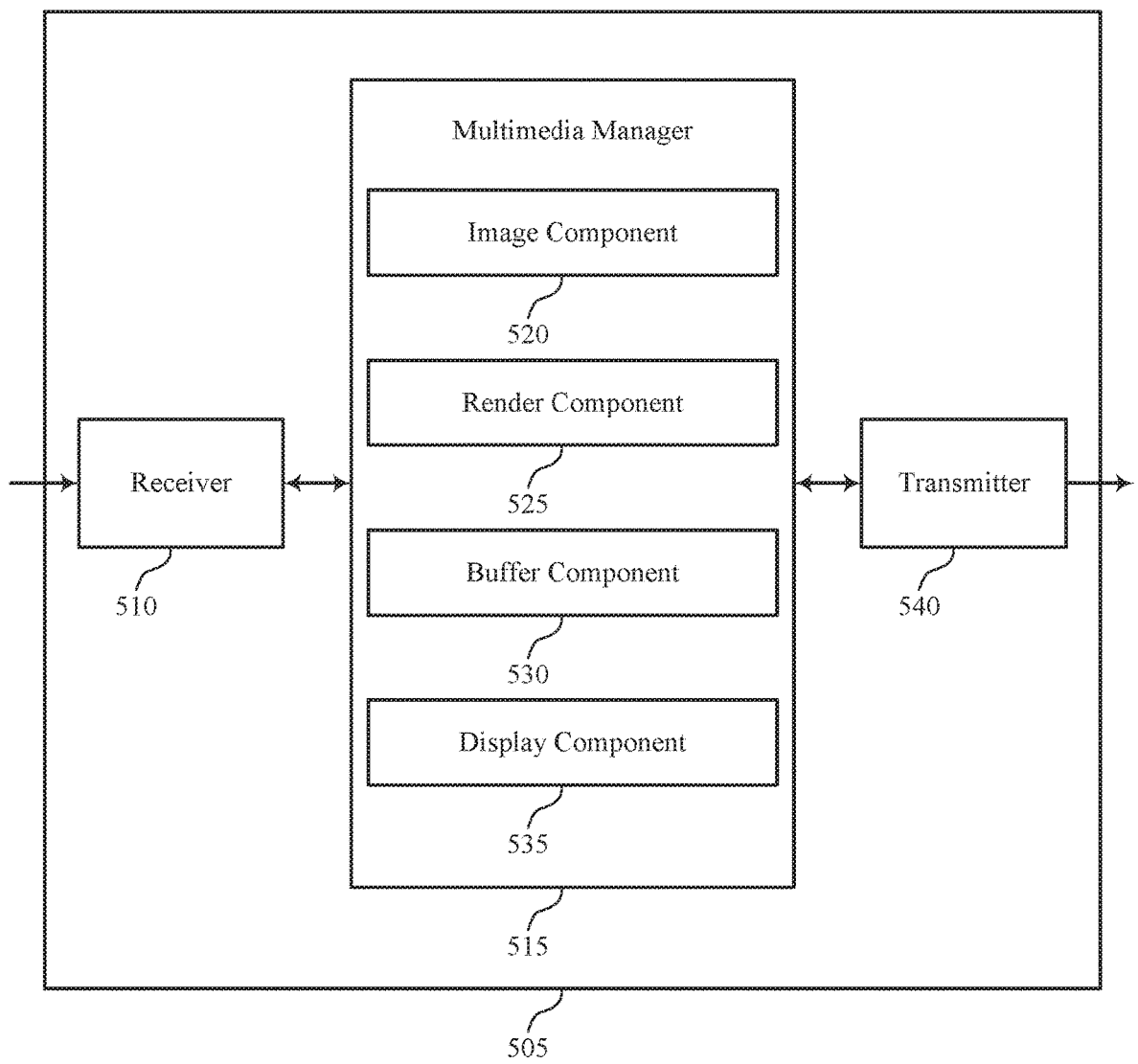

FIG. 5 shows a block diagram 500 of a device 505 that supports bin filtering in accordance with aspects of the present disclosure. The device 505 may be an example of aspects of a device 405 or a device 115 as described herein. The device 505 may include a receiver 510, a multimedia manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to bin filtering, etc.). Information may be passed on to other components of the device 505. The receiver 510 may be an example of aspects of the transceiver 720 described with reference to FIG. 7. The receiver 510 may utilize a single antenna or a set of antennas.

The multimedia manager 515 may be an example of aspects of the multimedia manager 415 as described herein. The multimedia manager 515 may include an image component 520, a render component 525, a buffer component 530, and a display component 535. The multimedia manager 515 may be an example of aspects of the multimedia manager 710 described herein.

The image component 520 may receive an image including a set of pixels. The render component 525 may render a first subset of pixels in each bin of a set of bins during a first rendering pass. The buffer component 530 may defer rendering a second subset of pixels and a third subset of pixels in each bin of the set of bins during the first rendering pass, where the second subset of pixels includes edge pixels associated with the set of pixels and the third subset of pixels is between the first subset of pixels and the second subset of pixels. The render component 525 may render the second subset of pixels and the third subset of pixels in each bin of the set of bins during a second rendering pass based on rendering the first subset of pixels. The display component 535 may output a representation of the image based on rendering the first subset of pixels during the first rendering pass and rendering the second subset of pixels and the third subset of pixels during the second rendering pass.

The transmitter 540 may transmit signals generated by other components of the device 505. In some examples, the transmitter 540 may be collocated with a receiver 510 in a transceiver component. For example, the transmitter 540 may be an example of aspects of the transceiver 720 described with reference to FIG. 7. The transmitter 540 may utilize a single antenna or a set of antennas.

Figure 6:
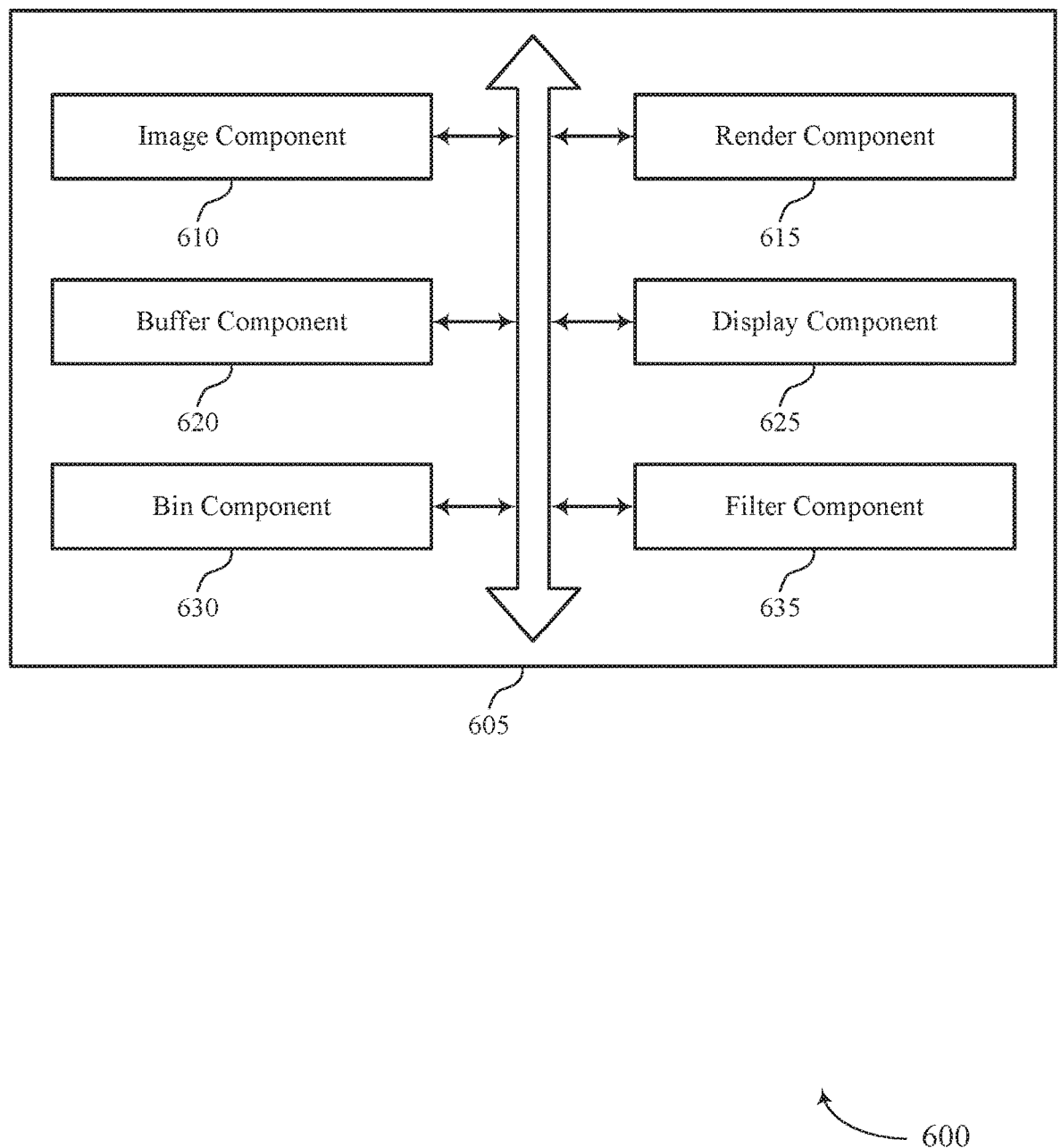
FIG. 6 shows a block diagram of a multimedia manager that supports bin filtering in accordance with aspects of the present disclosure.

FIG. 6 shows a block diagram 600 of a multimedia manager 605 that supports bin filtering in accordance with aspects of the present disclosure. The multimedia manager 605 may be an example of aspects of a multimedia manager 415, a multimedia manager 515, or a multimedia manager 710 described herein. The multimedia manager 605 may include an image component 610, a render component 615, a buffer component 620, a display component 625, a bin component 630, and a filter component 635. Each of these components may communicate, directly or indirectly, with one another (e.g., via one or more buses).

The image component 610 may receive an image including a set of pixels. The render component 615 may render a first subset of pixels in each bin of a set of bins during a first rendering pass. In some examples, the render component 615 may render a second subset of pixels and a third subset of pixels in each bin of the set of bins during a second rendering pass based on rendering the first subset of pixels. In some examples, the render component 615 may render the first subset of pixels per bin. In some examples, the render component 615 may render the second subset of pixels and the third subset of pixels jointly for all bins of the set of bins. In some examples, the render component 615 may render the second subset of pixels based on rendering the third subset of pixels. In some cases, the first subset of pixels in each bin of the set of bins include interior pixels of each bin of the set of bins. In some cases, the second subset of pixels in each bin of the set of bins are nonoverlapping with the first subset of pixels in each bin of the set of bins.

The buffer component 620 may defer rendering the second subset of pixels and the third subset of pixels in each bin of the set of bins during the first rendering pass, where the second subset of pixels includes edge pixels associated with the set of pixels and the third subset of pixels is between the first subset of pixels and the second subset of pixels. In some examples, the buffer component 620 may output the rendered first subset of pixels to a resolve surface of a system memory of the device. In some examples, the buffer component 620 may output the deferred second subset of pixels and the deferred third subset of pixels to a deferred surface of the system memory of the device. In some examples, the buffer component 620 may erase a graphics memory of the device based on deferring the rendering of the second subset of pixels and the third subset of pixels, where erasing the graphics memory of the device is performed per bin for the set of bins.

The display component 625 may output a representation of the image based on rendering the first subset of pixels during the first rendering pass and rendering the second subset of pixels and the third subset of pixels during the second rendering pass. The bin component 630 may segment the image into the set of bins based on a default bin size, where rendering the first subset of pixels during the first rendering pass and rendering the second subset of pixels and the third subset of pixels during the second rendering pass is based on the default bin size. In some examples, determining a bin size smaller than the default bin size, where segmenting the image into the set of bins includes.

The bin component 630 may segment the image into the set of bins based on the determined bin size, where rendering the first subset of pixels during the first rendering pass and rendering the second subset of pixels and the third subset of pixels during the second rendering pass is based on the determined bin size smaller than the default bin size. In some examples, the bin component 630 may assign each bin of the set of bins as an interior bin, where rendering the first subset of pixels during the first rendering pass and rendering the second subset of pixels and the third subset of pixels during the second rendering pass is based on assigning each bin of the set of bins as the interior bin. The filter component 635 may apply a filter to the second subset of pixels for each bin of the set of bins. In some examples, the filter component 635 may determine the third subset of pixels for each bin of the set of bins based on a filter width of the filter. In some cases, the third subset of pixels for each bin of the set of bins correspond to a region associated with the filter width.

Figure 7:
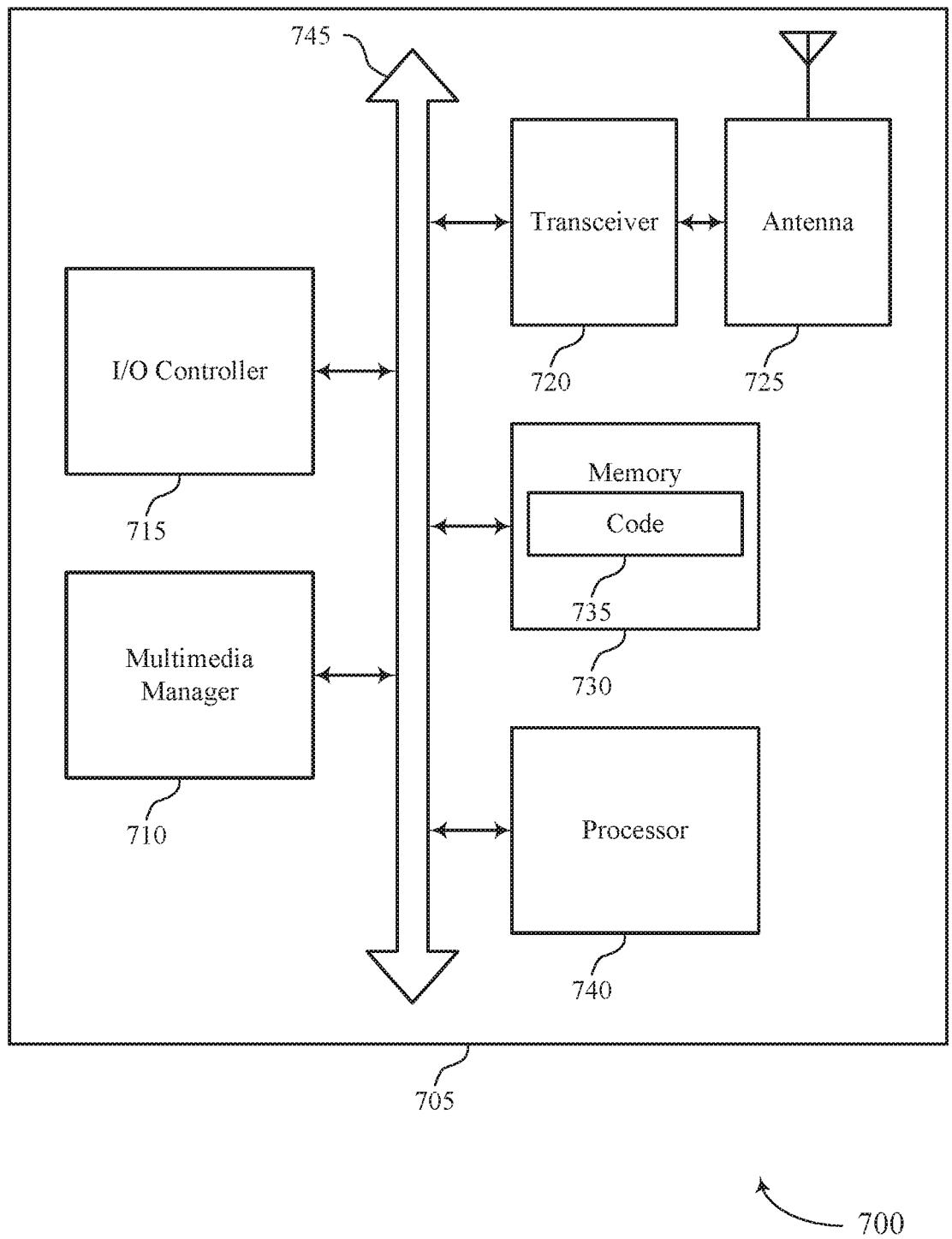
FIG. 7 shows a diagram of a system including a device that supports bin filtering in accordance with aspects of the present disclosure.

FIG. 7 shows a diagram of a system 700 including a device 705 that supports bin filtering in accordance with aspects of the present disclosure. The device 705 may be an example of or include the components of device 405, device 505, or a device as described herein. The device 705 may include components for bi-directional voice and data communications including components for transmitting and receiving communications, including a multimedia manager 710, an I/O controller 715, a transceiver 720, an antenna 725, memory 730, a processor 740, and a coding manager 750. These components may be in electronic communication via one or more buses (e.g., bus 745).

The multimedia manager 710 may receive an image including a set of pixels, render a first subset of pixels in each bin of a set of bins during a first rendering pass, render the second subset of pixels and the third subset of pixels in each bin of the set of bins during a second rendering pass based on rendering the first subset of pixels, defer rendering a second subset of pixels and a third subset of pixels in each bin of the set of bins during the first rendering pass, where the second subset of pixels includes edge pixels associated with the set of pixels and the third subset of pixels is between the first subset of pixels and the second subset of pixels, and output a representation of the image based on rendering the first subset of pixels during the first rendering pass and rendering the second subset of pixels and the third subset of pixels during the second rendering pass.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases, the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The code 735 may include instructions to implement aspects of the present disclosure, including instructions to support graphics processing. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting bin filtering).

Figure 8:
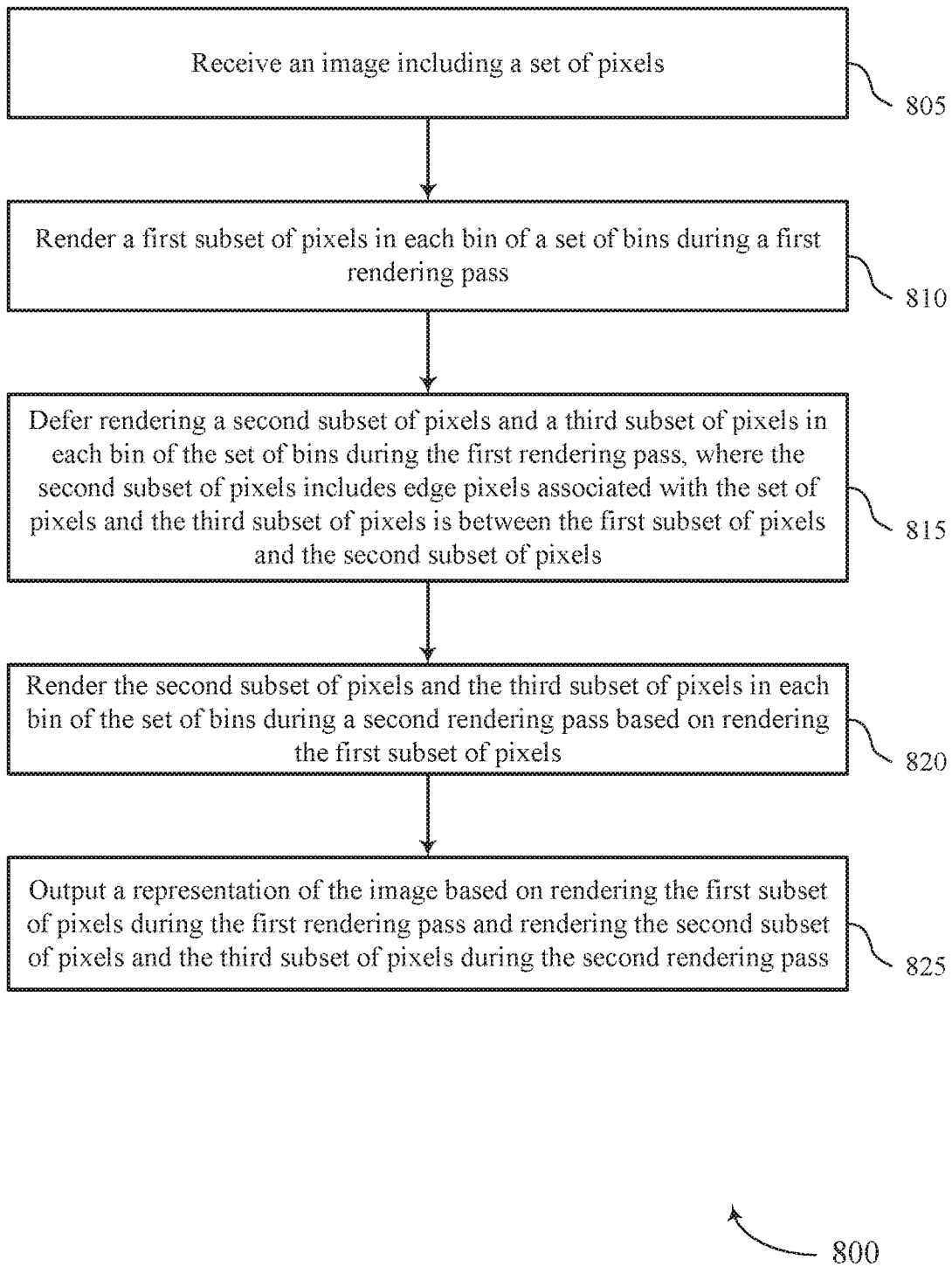
FIGS. 8 through 10 show flowcharts illustrating methods that support bin filtering in accordance with aspects of the present disclosure.

FIG. 8 shows a flowchart illustrating a method 800 that supports bin filtering in accordance with aspects of the present disclosure. The operations of method 800 may be implemented by a device or its components as described herein. For example, the operations of method 800 may be performed by a multimedia manager as described with reference to FIGS. 4 through 7. In some examples, a device may execute a set of instructions to control the functional elements of the device to perform the functions described herein. Additionally or alternatively, a device may perform aspects of the functions described herein using special-purpose hardware.

At 805, the device may receive an image including a set of pixels. The operations of 805 may be performed according to the methods described herein. In some examples, aspects of the operations of 805 may be performed by an image component as described with reference to FIGS. 4 through 7.

At 810, the device may render a first subset of pixels in each bin of a set of bins during a first rendering pass. The operations of 810 may be performed according to the methods described herein. In some examples, aspects of the operations of 810 may be performed by a render component as described with reference to FIGS. 4 through 7.

At 815, the device may defer rendering a second subset of pixels and a third subset of pixels in each bin of the set of bins during the first rendering pass, where the second subset of pixels includes edge pixels associated with the set of pixels and the third subset of pixels is between the first subset of pixels and the second subset of pixels. The operations of 815 may be performed according to the methods described herein. In some examples, aspects of the operations of 815 may be performed by a buffer component as described with reference to FIGS. 4 through 7.

At 820, the device may render the second subset of pixels and the third subset of pixels in each bin of the set of bins during a second rendering pass based on rendering the first subset of pixels. The operations of 820 may be performed according to the methods described herein. In some examples, aspects of the operations of 820 may be performed by a render component as described with reference to FIGS. 4 through 7.

At 825, the device may output a representation of the image based on rendering the first subset of pixels during the first rendering pass and rendering the second subset of pixels and the third subset of pixels during the second rendering pass. The operations of 825 may be performed according to the methods described herein. In some examples, aspects of the operations of 825 may be performed by a display component as described with reference to FIGS. 4 through 7.

Figure 9:
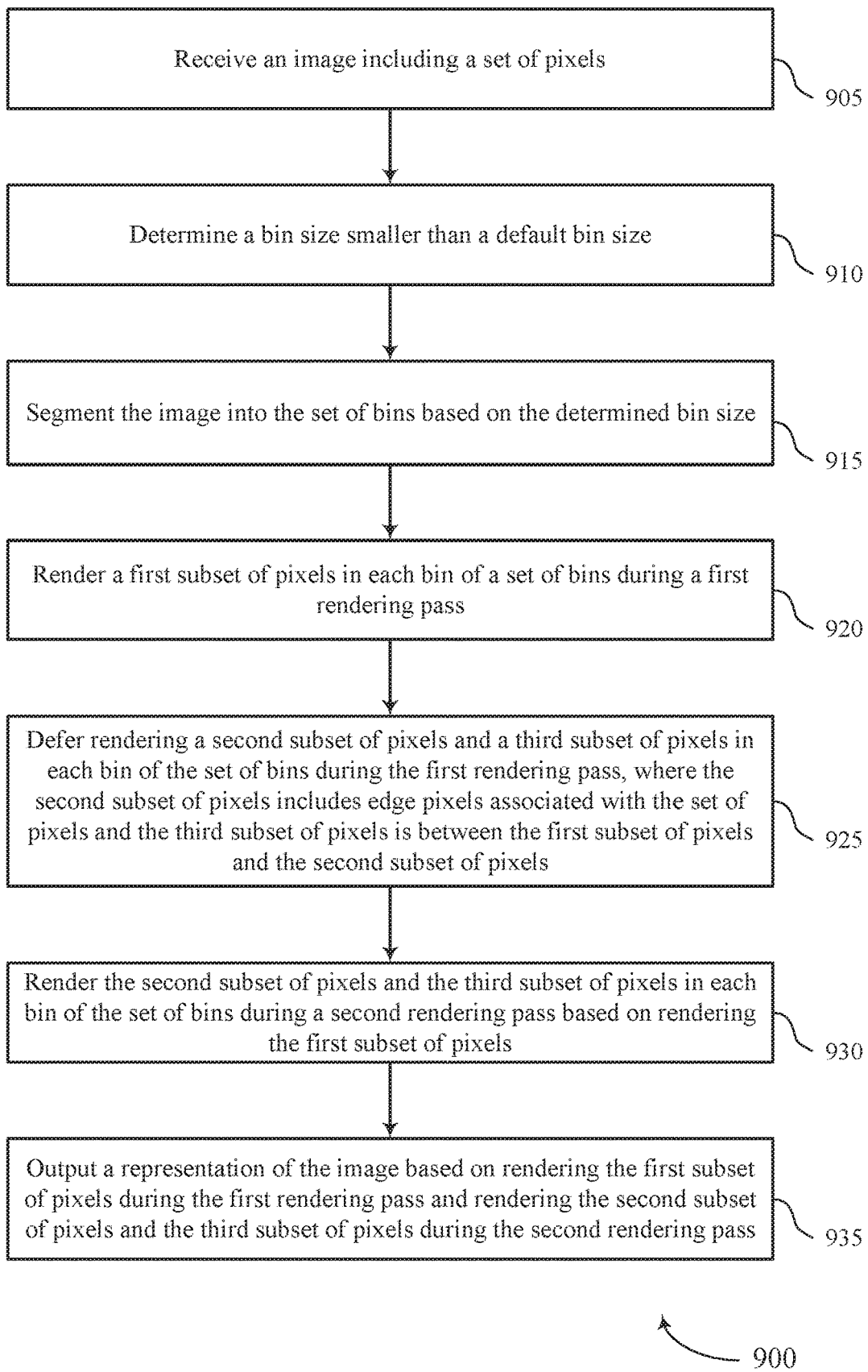

FIG. 9 shows a flowchart illustrating a method 900 that supports bin filtering in accordance with aspects of the present disclosure. The operations of method 900 may be implemented by a device or its components as described herein. For example, the operations of method 900 may be performed by a multimedia manager as described with reference to FIGS. 4 through 7. In some examples, a device may execute a set of instructions to control the functional elements of the device to perform the functions described herein. Additionally or alternatively, a device may perform aspects of the functions described herein using special-purpose hardware.

At 905, the device may receive an image including a set of pixels. The operations of 905 may be performed according to the methods described herein. In some examples, aspects of the operations of 905 may be performed by an image component as described with reference to FIGS. 4 through 7.

At 910, the device may determine a bin size smaller than a default bin size. The operations of 910 may be performed according to the methods described herein. In some examples, aspects of the operations of 910 may be performed by a bin component as described with reference to FIGS. 4 through 7.

At 915, the device may segment the image into the set of bins based on the determined bin size. The operations of 915 may be performed according to the methods described herein. In some examples, aspects of the operations of 915 may be performed by a bin component as described with reference to FIGS. 4 through 7.

At 920, the device may render a first subset of pixels in each bin of a set of bins during a first rendering pass. The operations of 920 may be performed according to the methods described herein. In some examples, aspects of the operations of 920 may be performed by a render component as described with reference to FIGS. 4 through 7.

At 925, the device may defer rendering a second subset of pixels and a third subset of pixels in each bin of the set of bins during the first rendering pass, where the second subset of pixels includes edge pixels associated with the set of pixels and the third subset of pixels is between the first subset of pixels and the second subset of pixels. The operations of 925 may be performed according to the methods described herein. In some examples, aspects of the operations of 925 may be performed by a buffer component as described with reference to FIGS. 4 through 7.

At 930, the device may render the second subset of pixels and the third subset of pixels in each bin of the set of bins during a second rendering pass based on rendering the first subset of pixels. The operations of 930 may be performed according to the methods described herein. In some examples, aspects of the operations of 930 may be performed by a render component as described with reference to FIGS. 4 through 7.

At 935, the device may output a representation of the image based on rendering the first subset of pixels during the first rendering pass and rendering the second subset of pixels and the third subset of pixels during the second rendering pass. The operations of 935 may be performed according to the methods described herein. In some examples, aspects of the operations of 935 may be performed by a display component as described with reference to FIGS. 4 through 7.

Figure 10:
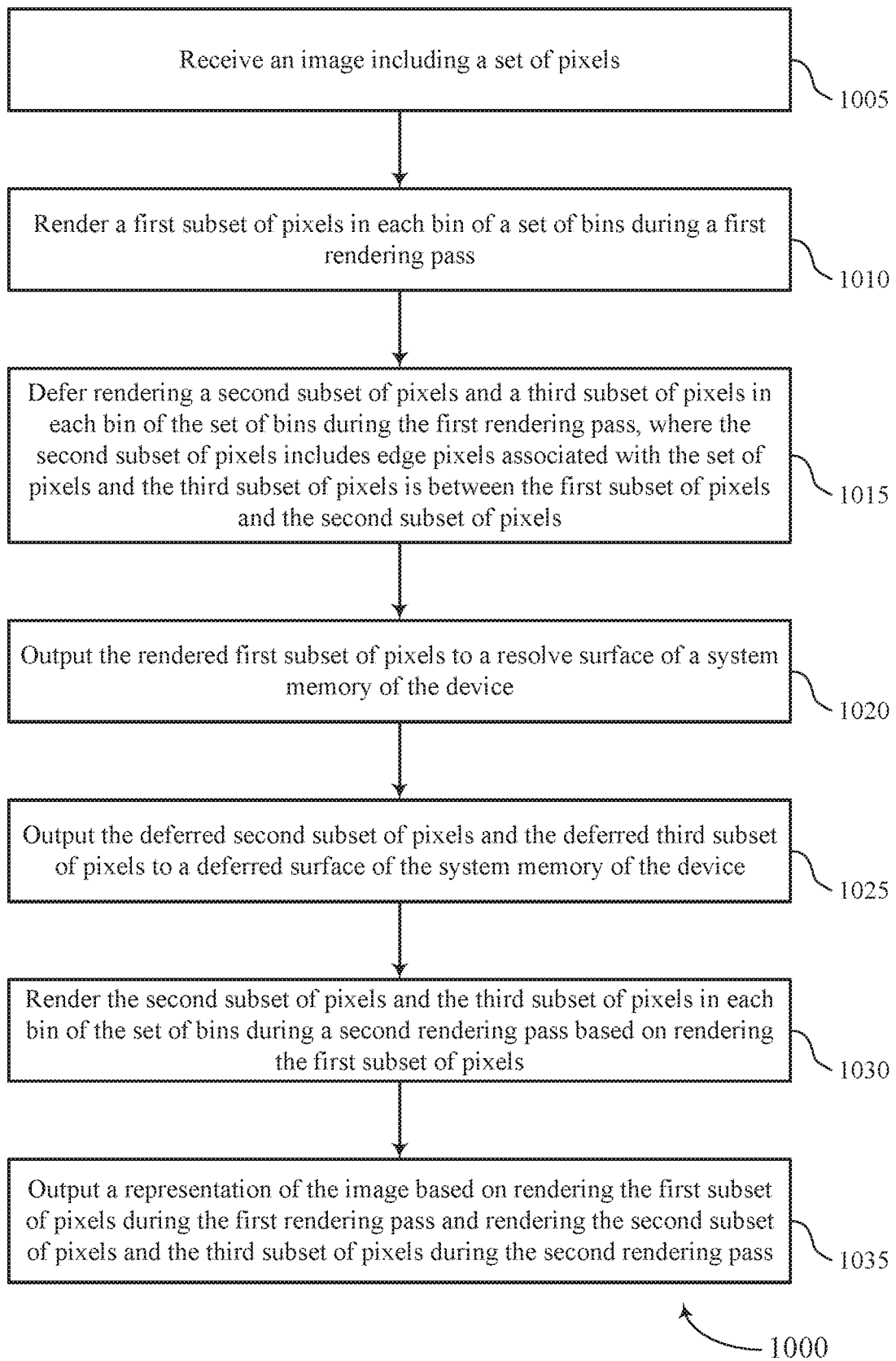

FIG. 10 shows a flowchart illustrating a method 1000 that supports bin filtering in accordance with aspects of the present disclosure. The operations of method 1000 may be implemented by a device or its components as described herein. For example, the operations of method 1000 may be performed by a multimedia manager as described with reference to FIGS. 4 through 7. In some examples, a device may execute a set of instructions to control the functional elements of the device to perform the functions described herein. Additionally or alternatively, a device may perform aspects of the functions described herein using special-purpose hardware.

At 1005, the device may receive an image including a set of pixels. The operations of 1005 may be performed according to the methods described herein. In some examples, aspects of the operations of 1005 may be performed by an image component as described with reference to FIGS. 4 through 7.

At 1010, the device may render a first subset of pixels in each bin of a set of bins during a first rendering pass. The operations of 1010 may be performed according to the methods described herein. In some examples, aspects of the operations of 1010 may be performed by a render component as described with reference to FIGS. 4 through 7.

At 1015, the device may defer rendering a second subset of pixels and a third subset of pixels in each bin of the set of bins during the first rendering pass, where the second subset of pixels includes edge pixels associated with the set of pixels and the third subset of pixels is between the first subset of pixels and the second subset of pixels. The operations of 1015 may be performed according to the methods described herein. In some examples, aspects of the operations of 1015 may be performed by a buffer component as described with reference to FIGS. 4 through 7.

At 1020, the device may output the rendered first subset of pixels to a resolve surface of a system memory of the device. The operations of 1020 may be performed according to the methods described herein. In some examples, aspects of the operations of 1020 may be performed by a buffer component as described with reference to FIGS. 4 through 7.

At 1025, the device may output the deferred second subset of pixels and the deferred third subset of pixels to a deferred surface of the system memory of the device. The operations of 1025 may be performed according to the methods described herein. In some examples, aspects of the operations of 1025 may be performed by a buffer component as described with reference to FIGS. 4 through 7.

At 1030, the device may render the second subset of pixels and the third subset of pixels in each bin of the set of bins during a second rendering pass based on rendering the first subset of pixels. The operations of 1030 may be performed according to the methods described herein. In some examples, aspects of the operations of 1030 may be performed by a render component as described with reference to FIGS. 4 through 7.

At 1035, the device may output a representation of the image based on rendering the first subset of pixels during the first rendering pass and rendering the second subset of pixels and the third subset of pixels during the second rendering pass. The operations of 1035 may be performed according to the methods described herein. In some examples, aspects of the operations of 1035 may be performed by a display component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also; any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for graphics processing at a device, comprising:
   receiving an image comprising a set of pixels;
   rendering a first subset of pixels in each bin of a set of bins during a first rendering pass;
   applying a filter to a second subset of pixels for each bin of the set of bins;
   determining a third subset of pixels for each bin of the set of bins based at least in part on a filter width of the filter;
   deferring rendering the second subset of pixels and the third subset of pixels in each bin of the set of bins during the first rendering pass, wherein the second subset of pixels comprises edge pixels associated with the set of pixels and the third subset of pixels is between the first subset of pixels and the second subset of pixels;
   rendering the second subset of pixels and the third subset of pixels in each bin of the set of bins during a second rendering pass based at least in part on rendering the first subset of pixels; and
   outputting a representation of the image based at least in part on rendering the first subset of pixels during the first rendering pass and rendering the second subset of pixels and the third subset of pixels during the second rendering pass.

2. The method of claim 1, further comprising:
   segmenting the image into the set of bins based at least in part on a default bin size,
   wherein rendering the first subset of pixels during the first rendering pass and rendering the second subset of pixels and the third subset of pixels during the second rendering pass is based at least in part on the default bin size.

3. The method of claim 2, further comprising:
   determining a bin size smaller than the default bin size, wherein segmenting the image into the set of bins comprises:
      segmenting the image into the set of bins based at least in part on the determined bin size, wherein rendering the first subset of pixels during the first rendering pass and rendering the second subset of pixels and the third subset of pixels during the second rendering pass is based at least in part on the determined bin size smaller than the default bin size.

4. The method of claim 1, wherein the third subset of pixels for each bin of the set of bins correspond to a region associated with the filter width.

5. The method of claim 1, further comprising:
   assigning one or more bins of the set of bins as interior bins, wherein rendering the first subset of pixels during the first rendering pass and rendering the second subset of pixels and the third subset of pixels during the second rendering pass is based at least in part on assigning the one or more bins of the set of bins as interior bins.

6. The method of claim 1, wherein rendering the first subset of pixels in each bin of the set of bins during the first rendering pass comprises:
   rendering the first subset of pixels per bin.

7. The method of claim 1, wherein rendering the second subset of pixels and the third subset of pixels in each bin of the set of bins during the second rendering pass comprises:
   rendering the second subset of pixels and the third subset of pixels jointly for all bins of the set of bins.

8. The method of claim 1, further comprising:
   outputting the rendered first subset of pixels to a resolve surface of a system memory of the device; and
   outputting the deferred second subset of pixels and the deferred third subset of pixels to a deferred surface of the system memory of the device.

9. The method of claim 1, further comprising:
   erasing a graphics memory of the device based at least in part on deferring the rendering of the second subset of pixels and the third subset of pixels,
   wherein erasing the graphics memory of the device is performed per bin for the set of bins.

10. The method of claim 1, wherein the first subset of pixels in each bin of the set of bins comprise interior pixels of each bin of the set of bins, and wherein the first subset of pixels correspond to a region of each bin that are interior relative to the second subset of pixels and the third subset of pixels.

11. The method of claim 1, wherein the second subset of pixels in each bin of the set of bins are nonoverlapping with the first subset of pixels in each bin of the set of bins.

12. The method of claim 1, wherein:
   rendering the second subset of pixels is based at least in part on rendering the third subset of pixels.

13. An apparatus for graphics processing, comprising:
   a processor,
   memory coupled with the processor; and
   instructions stored in the memory and executable by the processor to cause the apparatus to:
      receive an image comprising a set of pixels;
      render a first subset of pixels in each bin of a set of bins during a first rendering pass;
      apply a filter to a second subset of pixels for each bin of the set of bins;
      determine a third subset of pixels for each bin of the set of bins based at least in part on a filter width of the filter;
      defer rendering the second subset of pixels and the third subset of pixels in each bin of the set of bins during the first rendering pass, wherein the second subset of pixels comprises edge pixels associated with the set of pixels and the third subset of pixels is between the first subset of pixels and the second subset of pixels;

render the second subset of pixels and the third subset of pixels in each bin of the set of bins during a second rendering pass based at least in part on rendering the first subset of pixels; and output a representation of the image based at least in part on rendering the first subset of pixels during the first rendering pass and rendering the second subset of pixels and the third subset of pixels during the second rendering pass.

14. The apparatus of claim 13, wherein the instructions are further executable by the processor to cause the apparatus to:

segment the image into the set of bins based at least in part on a default bin size, wherein the instructions to render the first subset of pixels during the first rendering pass and rendering the second subset of pixels and the third subset of pixels during the second rendering pass are further executable by the processor based at least in part on the default bin size.

15. The apparatus of claim 14, wherein the instructions are further executable by the processor to cause the apparatus to:

determine a bin size smaller than the default bin size, wherein segmenting the image into the set of bins comprises; and segment the image into the set of bins based at least in part on the determined bin size, wherein the instructions to render the first subset of pixels during the first rendering pass and rendering the second subset of pixels and the third subset of pixels during the second rendering pass are further executable by the processor based at least in part on the determined bin size smaller than the default bin size.

16. The apparatus of claim 13, wherein the third subset of pixels for each bin of the set of bins correspond to a region associated with the filter width.

17. The apparatus of claim 13, wherein the instructions are further executable by the processor to cause the apparatus to:

assign one or more bins of the set of bins as interior bins, wherein the instructions to render the first subset of pixels during the first rendering pass and rendering the second subset of pixels and the third subset of pixels during the second rendering pass are further executable by the processor based at least in part on assigning the one or more bins of the set of bins as interior bins.

18. An apparatus for graphics processing, comprising:

means for receiving an image comprising a set of pixels;

means for rendering a first subset of pixels in each bin of a set of bins during a first rendering pass;

means for applying a filter to a second subset of pixels for each bin of the set of bins;

means for determining a third subset of pixels for each bin of the set of bins based at least in part on a filter width of the filter;

means for deferring rendering the second subset of pixels and the third subset of pixels in each bin of the set of bins during the first rendering pass, wherein the second subset of pixels comprises edge pixels associated with the set of pixels and the third subset of pixels is between the first subset of pixels and the second subset of pixels;

means for rendering the second subset of pixels and the third subset of pixels in each bin of the set of bins during a second rendering pass based at least in part on rendering the first subset of pixels; and means for outputting a representation of the image based at least in part on rendering the first subset of pixels during the first rendering pass and rendering the second subset of pixels and the third subset of pixels during the second rendering pass.

* * * * *